(No Model.)
W. H. H. KEIZUR.
CROSSCUT SAW.
No. 482,365. Patented Sept. 13, 1892.
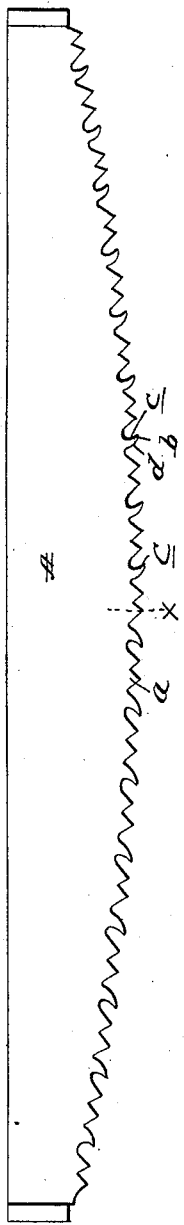
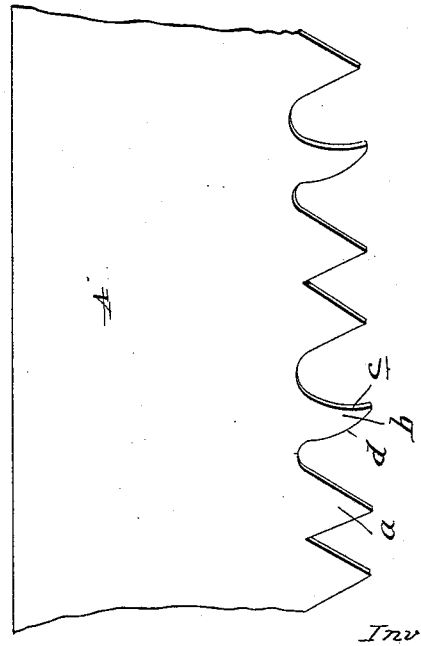
Witnesses:
C. H. Raeder
H. F. Matthews
Inventor
William H H Keizur
By James Sheehy
Attorney
THE NORRIS PETERS CO., PHOTO-LITHO., WASHINGTON, D. C.

UNITED STATES PATENT OFFICE.

WILLIAM HENRY HARRISON KEIZUR, OF RATHDRUM, IDAHO, ASSIGNOR OF THREE-FOURTHS TO FRANK O. HILL AND ROBERT S. McCREA, OF SAME PLACE.

CROSSCUT-SAW.

SPECIFICATION forming part of Letters Patent No. 482,365, dated September 13, 1892.

Application filed June 18, 1891. Serial No. 396,789. (No model.)

*To all whom it may concern:*

Be it known that I, WILLIAM HENRY HARRISON KEIZUR, a citizen of the United States, residing at Rathdrum, in the county of Kootenai and State of Idaho, have invented certain new and useful Improvements in Crosscut-Saws; and I do declare the following to be a full, clear, and exact description of the invention, such as will enable others skilled in the art to which it appertains to make and use the same.

This invention has relation to an improvement in crosscut-saws; and it has for its object to provide a saw more particularly designed for cutting large sticks—such as trees of very large diameter—and to adapt such saw for such purposes to drag or draw the dust and chips in the kerf from the center outwardly in opposite directions, the drag-teeth being so arranged as to offer little or no resistance to the proper cutting of the teeth, and will cut in but one direction.

It has heretofore been proposed to clear the dust from the center of the log by providing the blade with drag-teeth. Such a construction is shown in the Letters Patent granted to George B. Montgomery, dated August 25, 1868, in which a blade is shown having a straight tooth and a tooth having one straight edge and one curved edge alternating and also having short teeth constructed with a peculiarly-curved point, all turned in the same direction.

My invention differs from this patented device and all others in that I provide between every two straight teeth a single drag-tooth and curve them in opposite directions from the longitudinal center of the blade and also provide such drag-teeth with but one cutting-edge, the tooth being rounded off on one side, so that it will offer no resistance to the action of the saw when moving toward the center of the log.

In the accompanying drawings, Figure 1 illustrates a side view of my improved saw, and Fig. 2 is a fragmentary view on an enlarged scale.

Referring by letter to said drawings, A indicates the saw-blade, which may be of steel or other suitable material and mainly of the ordinary construction, having its opposite ends adapted to receive handles or be attached to a power-machine. The cutting-edge of the blade is provided with teeth $a$, arranged in pairs and have their opposite edges provided with cutters or formed into cutting-faces.

Arranged between each pair of teeth $a$ is a clearing or drag tooth $b$, having the curved or outer edges $c$ formed into cutters, while the reversed sides or edges $d$ are beveled or rounded off, as shown. These clearing or drag teeth, beginning from the center, as indicated at $x$, are directed toward opposite ends of the saw, so that they will drag the chips and dust in the kerf as the saw is drawn forward, thereby clearing the kerf from the center in opposite directions and passing over such dust and chips as may be cut in the thrust of the saw.

A saw thus constructed greatly improves its efficiency by producing more work in a given time and relieving the operator from unnecessary exertions.

Having described my invention, what I claim is—

As an improved article of manufacture, a saw-blade having cutting-teeth arranged in pairs and a drag-tooth between each pair of cutters, said drag-teeth being disposed in opposite directions from the longitudinal center of the blade and having but one cutting side and the reverse side rounded off or beveled, substantially as specified.

WILLIAM HENRY HARRISON KEIZUR.

Witnesses:
HENRY T. RAY,
ROBT. BRAGARY.